United States Patent Office 2,956,989
Patented Oct. 18, 1960

2,956,989

POLYMERIZATION OF 2-OLEFINS

James L. Jezl, Swarthmore, Pa., assignor to Sun Oil Company, Philadelphia, Pa., a corporation of New Jersey No Drawing. Filed Dec. 12, 1957, Ser. No. 702,220

7 Claims. (Cl. 260—88.2)

This invention relates to a process for the preparation of relatively high molecular weight polymers of olefins, and more particularly relates to a process for the preparation of solid polymers from olefins having internal double bonds.

Alpha-olefins such as propylene have heretofore been polymerized to high molecular weight solid polymers. A catalyst which is especially effective for the polymerization of alpha-olefins to such relatively high molecular weight solid polymers is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing alpha-olefins to solid polymers. If desired, a solid lower halide such as titanium trichloride can be preformed, dispersed in an inert liquid, and an activator such as an aluminum trialkyl added to form the catalyst system for polymerizing alpha-olefins to solid polymers. In performing the polymerization step, an alpha-olefin is contacted with the solid catalyst, such as by introducing the olefin into a suspension of the finely divided solid in the inert, liquid reaction medium, and the olefin is therein polymerized to solid polymers. Anhydrous and oxygen-free conditions are used throughout the process since the catalyst is deactivated by contact with water or oxygen.

Such processes, however, are not effective for the polymerization of olefins having internal double bonds, i.e., monoolefins in which the olefinic double bond is not attached to a terminal carbon atom. Such olefins, when used in the process as above described, may be converted to dimers or trimers, but are not polymerized to solid, high molecular weight polymers.

An object of the present invention is to provide a process for the conversion of olefins having internal double bonds to solid high molecular weight polymers. Other objects and their achievement in accordance with the process of the present invention will be apparent hereinafter.

It has now been found that by contacting, under polymerizing conditions, an olefin in which the olefinic bond is internal with a catalyst system consisting essentially of particles of a subhalide of a metal of groups IV, V or VI of the periodic table and particles of an aluminum halide dispersed in an inert, liquid reaction medium having incorporated therein an alkali metal hydride, as hereinafter more fully described, the olefin is rapidly converted to high molecular weight solid polymers.

Olefins which can be polymerized in accordance with the invention are monoolefins in which the olefinic linkage is an internal double bond, i.e., are mono-unsaturated hydrocarbons having an olefinic linkage connecting non-terminal carbon atoms. Butene-2, pentene-2, hexene-2, 4,4-dimethylpentene-2, and homologues thereof having not more than 8 carbon atoms per molecule give good results. Mixtures of such olefins can also be used to prepare copolymers. The olefinic linkage should connect two secondary carbon atoms, since olefins in which an unsaturated carbon is attached to three other carbon atoms does not give good results in the process.

As above stated, the catalytic system of the invention consists essentially of solid particles of a metal subhalide, an aluminum halide, and an alkali metal hydride dispersed in an inert, liquid reaction medium. The metal of the subhalide can be a metal of group IV, V or VI of the periodic table, and is preferably zirconium, chromium, vanadium, molybdenum or titanium, and by "subhalide" is meant a halide wherein the metal is in a valence state other than its highest valence state. The reduction of a metal compound such as titanium tetrachloride is a convenient means of preparing a metal subhalide, and can be accomplished by any convenient means. As above described, an aluminum trialkyl can be used as the reducing agent, or other reducing means such as by contacting the metal compound with a dispersion of an alkali metal in an inert solvent, or by contacting with hydrogen at an elevated temperature, can be used. It is necessary, however, that an alkali metal hydride be present as a component of the catalytic system, and it is convenient in many instances to employ such a hydride as the reducing agent. Lithium hydride, sodium hydride and potassium hydrides are the preferred alkali metal hydrides to employ. Generally a mole ratio of alkali metal hydride to metal subhalide of 1:1 to 12:1 is used.

An aluminum halide is an essential component of the reaction mixture. Aluminum trichloride and aluminum trifluoride give good results. Preferably, the mole ratio of aluminum halide to metal subhalide is from about 0.2:1 to 10:1 but it is preferred to operate in the range of from 1:1 to 5:1.

The catalytic system is conveniently prepared by dispersing particles of titanium trichloride and particles of aluminum trichloride, for example, in the inert reaction medium. Sodium hydride, used as illustrative of the alkali metal hydrides which can be used, is then added. However, the components can be added in any order and good results obtained.

The inert, liquid reaction medium is preferably a saturated hydrocarbon which is liquid under the conditions employed in the polymerization process. The hexanes, heptanes, octanes, decanes, cyclohexanes, and homologues and mixtures thereof give good results. The quantity of reaction medium to employ does not appear critical, and generally from 10 to 100 or more parts thereof per part of metal subhalide plus aluminum halide will be used. By "parts," as used herein, is meant parts by weight.

On contacting the catalytic system with an olefin having an internal double bond, under polymerizing conditions, the olefin is rapidly polymerized to high molecular weight solid polymers.

The temperature in the present process should be maintained within the range of from 20° C. to 150° C. The pressure must be sufficient to maintain liquid phase reaction, and pressures of from atmospheric to 1,000 p.s.i.g. (pounds per square inch gauge) or more give good results. While the pressure does not appear critical, a more rapid rate is obtained at mildly elevated pressures, say from about 50 to 300 p.s.i.g. Time does not appear to be a critical variable, it being apparent that sufficient time to obtain a desired degree of polymerization, or to complete the polymerization reaction, should be allowed. Substantially anhydrous and oxygen-free conditions are used throughout the process, since contacting such materials tends to destroy the catalytic activity of the present catalytic system. It is believed that in the catalytic system of the present invention, olefins having internal double bonds are isomerized to alpha-olefins, i.e., olefins having a terminal olefinic bond, and that the alpha-olefins are then polymerized to the high molecular weight solid polymer products of the invention.

The polymer products of the invention are useful as thin films for packaging materials, as containers for fluids, as conduits for fluids, and the like. Such articles can be made by extrusion, molding, or other fabrication processes.

The following specific embodiment illustrates the process of the invention:

Into about 21 parts of n-heptane contained in a reactor are introduced 1 part of titanium trichloride particles, 0.31 part of sodium hydride and 0.87 part of aluminum trichloride. Butene-2 is introduced, with stirring, into the reactor and the temperature adjusted to 130° C., the pressure being about 100 p.s.i.g. The reaction is continued with constant stirring for 8 hours, during which time the temperature is maintained at substantially 130° C. and the pressure at substantially 100 p.s.i.g. by the periodic introduction of butene-2 into the reactor. Excess butene-2 is then vented and methanol introduced into the reactor to stop the reaction. The solid polymer product is then comminuted in contact with a 10% solution of hydrogen chloride in methanol to extract inorganic materials from the polymer product. After draining, washing and drying, there is recovered about 6 parts of a white, solid granular polymer product.

When other olefins having internal unsaturation, and/or when other catalytic components are employed, within the limits herein described, substantially equivalent results are obtained.

The invention claimed is:

1. Process for the polymerization of mono-unsaturated hydrocarbons which comprises contacting, under polymerizing conditions, a 2-olfin having 4 to 8 carbon atoms with a catalytic system consisting essentially of a dispersion of titanium trichloride, aluminum trichloride and an alkali metal hydride in an inert, liquid reaction medium, and recovering a solid polymer of said olefin.

2. Process for the polymerization of mono-unsaturated hydrocarbons which comprises contacting, under polymerizing conditions, a 2-olefin having 4 to 8 carbon atoms with a catalytic system consisting essentially of a dispersion of titanium trichloride, aluminum trichloride and sodium hydride in an inert, liquid reaction medium wherein the mole ratio of sodium hydride to titanium trichloride is from 1:1 to 12:1 and the mole ratio of aluminum trichloride to titanium trichloride is from 0.2:1 to 10:1.

3. Process according to claim 2 wherein said olefin is butene-2.

4. Process according to claim 2 wherein said olefin is pentene-2.

5. Process according to claim 2 wherein said olefin is hexene-2.

6. Process according to claim 2 wherein said olefin is 4,4-dimethylpentene-2.

7. Process according to claim 2 wherein said olefin is a mixture of 2-olefins.

References Cited in the file of this patent

UNITED STATES PATENTS

| | | |
|---|---|---|
| 2,727,024 | Field et al. | Dec. 13, 1955 |
| 2,914,517 | Schmerling | Nov. 24, 1959 |

FOREIGN PATENTS

| | | |
|---|---|---|
| 1,140,429 | France | Mar. 4, 1957 |

OTHER REFERENCES

Egloff et al.: Chem. Review, vol. 20 (1937), pages 360–368.